(12) United States Patent
Eruslanov et al.

(10) Patent No.: US 7,894,452 B2
(45) Date of Patent: Feb. 22, 2011

(54) METHOD AND APPARATUS FOR THE CREATION OF TCP SEGMENTS BY SIMULTANEOUS USE OF COMPUTING DEVICE COMPONENTS

(75) Inventors: Eugene Eruslanov, Moscow (RU); Ivan Gorinov, Moscow (RU)

(73) Assignee: Intel Corporation, Santa Clara, CA (US)

( * ) Notice: Subject to any disclaimer, the term of this patent is extended or adjusted under 35 U.S.C. 154(b) by 767 days.

(21) Appl. No.: 11/808,806

(22) Filed: Jun. 13, 2007

(65) Prior Publication Data

US 2008/0310434 A1    Dec. 18, 2008

(51) Int. Cl.
*H04L 12/56* (2006.01)
(52) U.S. Cl. ............ 370/395.5; 370/401; 370/428
(58) Field of Classification Search ........ 370/336, 370/401, 216, 329, 352, 392, 395.5, 428; 455/424; 725/81; 714/716
See application file for complete search history.

(56) References Cited

U.S. PATENT DOCUMENTS

| | | | | |
|---|---|---|---|---|
| 5,956,631 | A * | 9/1999 | Gerszberg et al. | 455/403 |
| 6,249,516 | B1 * | 6/2001 | Brownrigg et al. | 370/338 |
| 6,411,632 | B2 * | 6/2002 | Lindgren et al. | 370/466 |
| 6,742,051 | B1 * | 5/2004 | Bakshi et al. | 719/318 |
| 6,947,736 | B2 * | 9/2005 | Shaver et al. | 455/424 |
| 7,324,531 | B2 * | 1/2008 | Cho | 370/401 |
| 2002/0093928 | A1 * | 7/2002 | LoGalbo et al. | 370/336 |
| 2003/0016682 | A1 * | 1/2003 | Cho | 370/401 |
| 2003/0114153 | A1 * | 6/2003 | Shaver et al. | 455/424 |
| 2004/0143781 | A1 * | 7/2004 | DiMambro et al. | 714/716 |
| 2004/0187156 | A1 * | 9/2004 | Palm et al. | 725/81 |
| 2006/0053452 | A1 * | 3/2006 | Lee et al. | 725/81 |
| 2006/0062229 | A1 * | 3/2006 | Lee et al. | 370/401 |
| 2006/0168271 | A1 * | 7/2006 | Pabari et al. | 709/230 |
| 2006/0262716 | A1 * | 11/2006 | Ramaiah et al. | 370/216 |
| 2006/0276231 | A1 * | 12/2006 | Malcom | 455/563 |
| 2007/0121546 | A1 * | 5/2007 | Zuckerman et al. | 370/329 |
| 2007/0127443 | A1 * | 6/2007 | Spencer et al. | 370/352 |
| 2008/0037541 | A1 * | 2/2008 | Souissi et al. | 370/392 |
| 2008/0075103 | A1 * | 3/2008 | Noble et al. | 370/429 |
| 2008/0127277 | A1 * | 5/2008 | Kuschak | 725/74 |
| 2008/0263665 | A1 * | 10/2008 | Ma et al. | 726/23 |
| 2009/0080460 | A1 * | 3/2009 | Kronewitter et al. | 370/466 |
| 2009/0268632 | A1 * | 10/2009 | Pabari et al. | 370/252 |
| 2009/0274378 | A1 * | 11/2009 | Fukuhara et al. | 382/232 |

OTHER PUBLICATIONS

Buffer Management for TCP over GFR Service in an ATM Network; Piyaporn Krachodnok and Watit Bemjapolakul, 2001.*

* cited by examiner

*Primary Examiner*—Salman Ahmed
(74) *Attorney, Agent, or Firm*—Pearl Cohen Zedek Latzer, LLP

(57) ABSTRACT

A method and apparatus for segmenting data into TCP data segments using a first network communication component, and transmitting TCP data segments over a second network using a second network communication component. TCP data segments may be created by a first network card that may be in a loopback mode while a second network card may be sending TCP data segments onto a network. Both network communication cards may be operating simultaneously and may improve efficiency.

14 Claims, 3 Drawing Sheets

METHOD AND APPARATUS FOR THE CREATION OF TCP SEGMENTS BY SIMULTANEOUS USE OF COMPUTING DEVICE COMPONENTS

FIELD OF THE INVENTION

The present invention relates to network communication, and in particular to Transmission Control Protocol (TCP) packet management.

BACKGROUND OF THE INVENTION

Fixed and mobile computing devices often have both high speed Ethernet hardware for communication over a wired network and wireless communication hardware for communication over a wireless network. While both hardware components may separate data into Transmission Control Protocol (TCP) data segments and also may send these TCP data segments onto the respective networks, they operate independently of each other. Typically, computing device control software deactivates one set of communication hardware while the other is in operation in order to simplify communication control.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

Figure 1:
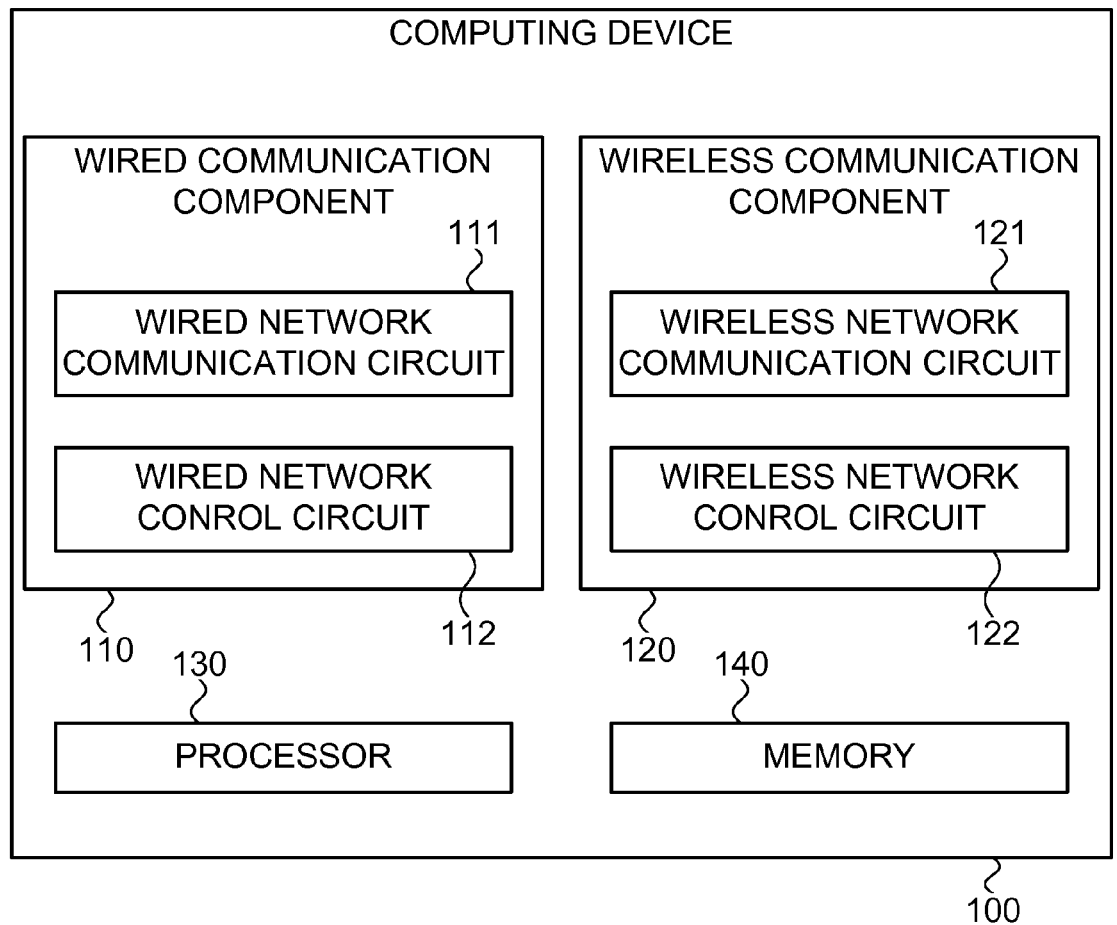
FIG. 1 is an exemplary block diagram according to an embodiment of the invention that includes one or more components that may communicate via a network.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of embodiments of the invention. However, it will be understood by those of ordinary skill in the art that the embodiments of the invention may be practiced without these specific details. In other instances, well-known methods, procedures, and components have not been described in detail so as not to obscure the present invention.

A data process is here, and generally, considered to be a self-consistent sequence of acts or operations leading to a desired result. This include physical manipulation of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

Unless explicitly stated, the method embodiments described herein are not constrained to a particular order or sequence. Additionally, some of the described method embodiments or elements thereof can occur or be performed at the same point in time.

FIG. 1 is an exemplary block diagram illustrating a computing device 100 according to an embodiment of the invention. According to an embodiment of the invention, computing device 100 may include a wired communication component 110 and a wireless communication component 120. Each of a wired communication component 110 and a wireless communication component 120 may be capable of communicating between computing device 100 and a respective network. For example, wired communication component 110 may include a wired network control circuit 112 for converting data to packets, and a wired network communication circuit 111 for communicating packets over a wired network, and wireless communication component 120 may include a wireless network control circuit 122 for converting data to packets, and a wireless network communication circuit 121 for communicating packets over a wireless network. Computing device 100 may also include a processor 130 and a memory 140, however, it will be noted that other configurations for computing device 100 are possible and within the scope of the invention.

In some embodiments of the present invention wired communication component 110 may be a Network Interface Card One Gigabyte card (NIC1G). Wired communication component 110 may receive data and separate data into Transmission Control Protocol (TCP) data segments. Wired communication component 110 may further be configured to create TCP data segments independently of other components of computing device 100. Wired communication component 110 may transmit TCP data segments to or receive TCP data segments from a network, or wired communication component 110 may send TCP data segments to or receive TCP data segments from memory 140. In some embodiments of the present invention wired communication component 110 may be a 10 Mb Ethernet card or a 100 Mb Ethernet card (NIC 10/100). A NIC 10/100 may be used for TCP checksum calculation. Wired communication component 110 may calculate a checksum for each TCP data packet and each Interface Protocol (IP) header. In some embodiments, wired communication component 110 may be any Network Interface Card (NIC) capable of operating in a loopback mode. In a loopback mode, wired communication component 110 may send and receive TCP data packets through a loopback. A loopback mode may be a mode of operation where data that may be processed or may be packetized, and thereafter, the TCP packets may be held internally in computing device 100, for example, in a memory, rather than being transmitted onto a network. A loopback may be, for example, any test mode that may operate in this, or a similarly suitable manner.

In some embodiments of the present invention wireless communication component 120 may be a wireless network (WiFi) card. Wireless communication component 120 may retrieve TCP segments from memory 140, and may transmit TCP data segments onto a network. Wireless communication component 120 may send TCP segments to memory 140, and may receive TCP data segments from a network. Wireless communication component 120 may receive data and separate data into TCP data segments, and may be able to create TCP data segments independently of other components of computing device 100. Accordingly, and without limitation in this respect, some apparatus, methods or systems embodying die present invention may improve or reduce computing time of a central processing unit (CPU), or provide additional or other beneficial performance results.

In some embodiments of the present invention, processor 130 may be a computer processor or any other circuit for control of data flow within a computing device or system. Processor 130 may route data to wired communication component 110 or to wireless communication component 120, or both. Processor 130 may route TCP data segments to or from memory 140, to or from Ethernet communication component 110, or to or from wireless communication component 120. In some embodiments of the invention, memory 140 may be associated with one of the communication components. Processor 130 may be programmed to allow wired communication component 110 and wireless communication component 120 to operate simultaneously. In some embodiments of the present invention, processor 130 may be configured or programmed to operate simultaneously wired communication component 110 and wireless communication component 120, for example, to achieve maximum data exchange performance over a network. For example, one communication component, e.g. the wired communication component, may separate or packetize data into TCP data segments, and another communication component, e.g. the wireless communication component, may transmit the prepared TCP data segments over its associated network. Such operation may also include recombination of data from TCP data segments, or reception of TCP data segments, or both. Processor 130 may be programmed with a bridge driver, which may be embodied or implemented in a program, software module, hardware, or any other suitable medium, and the bridge driver may use a NIC1G and a WiFi driver. A bridge driver may combine a NIC1G and a WiFi driver into a single network interface.

Figure 2:
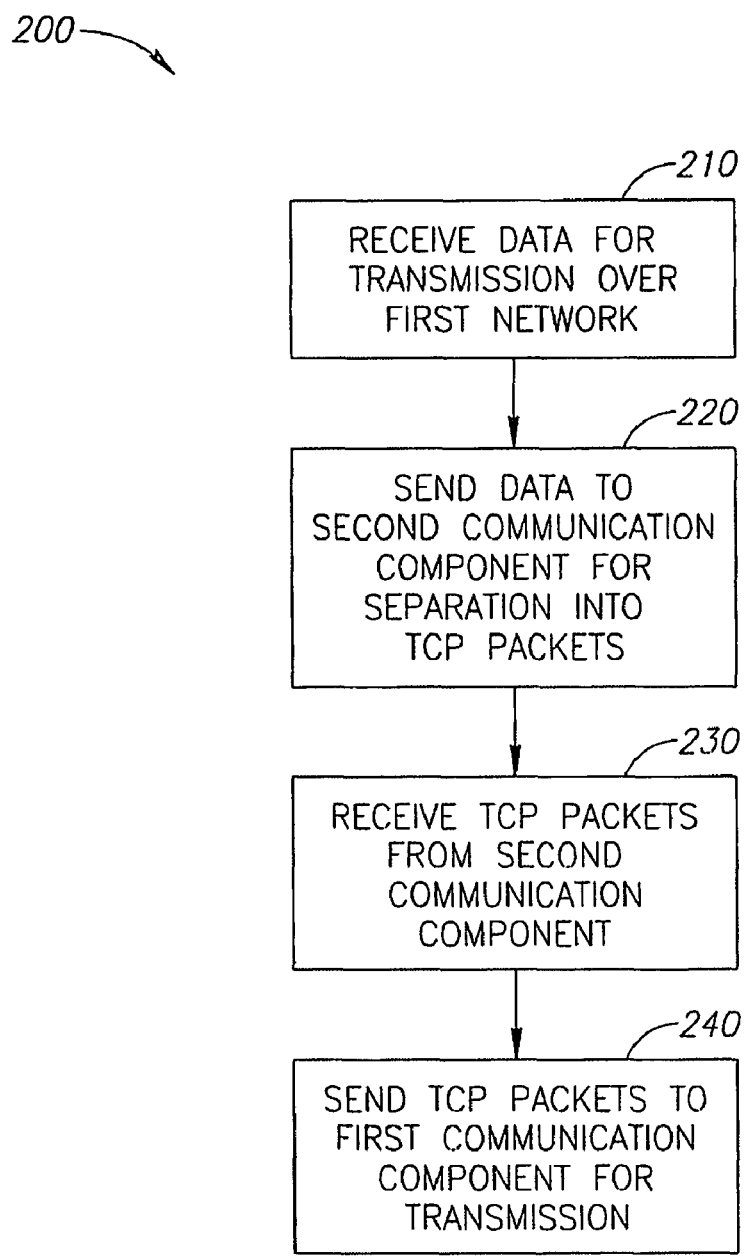
FIG. 2 is an exemplary flowchart according to an embodiment of the invention illustrating a method in accordance with an embodiment of the present invention.

FIG. 2 is a flowchart 200 illustrating a method in accordance with embodiments of the present invention that may use a first network communication circuit to create TCP data segments while a second network communication circuit may transmit the TCP data segments. At block 210, data from a computing device may be received for transmission onto a first network, and may be input to the communication components and drivers. In some implementations of the embodiment of the invention, a processor associated with the computing device may use, for example, a bridge driver to allocate data to a network communication device while another network communication device may be active.

At block 220, the data may be sent to a second communication component adapted to transmit over a second network, wherein the second communication component may separate or packetize the data into TCP packets. It will be recognized that in some embodiments of the invention, there may be intermediate blocks between block 210 and 220. For example, it may first be determined whether there may be a parallel data path, for example, a data path may be active from a processor to the second communication component in parallel to or simultaneous with the first communication component. A parallel data path may be, for example, a first communication device that is active and a second communication device that is active, at the same time. In some embodiments, a parallel data path may be, for example, any device within or associated with a processor or computing device that may separate data into TCP segments while a communication device is active. It will be understood that if there is no available parallel data path active, data may simply be routed to the first communication component as data, to be processed into TCP packets and transmitted as is known in the alt. In addition, for example, it may be determined prior to block 220 whether the second communication component has a loopback mode or other mode suitable for processing data into TCP packets and returning for sending over another network. Accordingly, if there is a parallel active data path, at block 220, data may be routed to a second communication component, for example, a wired communication component, or in some embodiments, a NIC1G.

At block 230, TCP packets produced by the second communication component may be received. It will be understood that between blocks 220 and block 230, the second communication component, whether attached, associated, or otherwise in communication with the computing device, separates or packetizes the data into the TCP packets that are received at block 230. It will be further understood that data prepared into TCP data segments may include checksum and/or other information as required by a TCP protocol. In some embodiments of the invention in which wired communication component 110 performs the separating into packets, the packetizing may be performed by placing the wired communication component 110 into a loopback mode of operation, wherein processing of data segments may occur within wired communication component 110, and the TCP data segment processing may occur without interaction with the central processing unit of the computing device 100. In some embodiments of the present invention, the TCP segments may be placed in a memory by the second communication component and retrieved, for example, by a computing device, or by the first communication component.

At block 240, data processed into TCP data segments by the second communication component may be routed to a first communication component, for example, a wireless communication component 120 for transmission over the first network. It will be understood that TCP data segments may first be routed to a memory and then may be routed to wireless communication component 120. The wired communication component 110 or the processor may control the routing of TCP data segments prepared by wired communication component 110. Data routing may occur independently of or in connection with an activity of wireless communication component 120. It will be understood that the first communication component may then transmit the TCP data segments over the first network. For example, if the first network is a wireless network, the wireless communication component 120 may transmit the TCP data segments wirelessly over the wireless network.

It will be understood that in some embodiments of the present invention, the communication components may operate simultaneously, for example, in queue fashion, wherein while the first communication component transmits TCP segments, the second communication component separates new data into packets for subsequent transmission. Accordingly, in some embodiments of the present invention, wired communication component 110 may send TCP data segments onto a network while simultaneously or in parallel, wireless communication component 120 may segment new data into TCP data segments.

Figure 3:
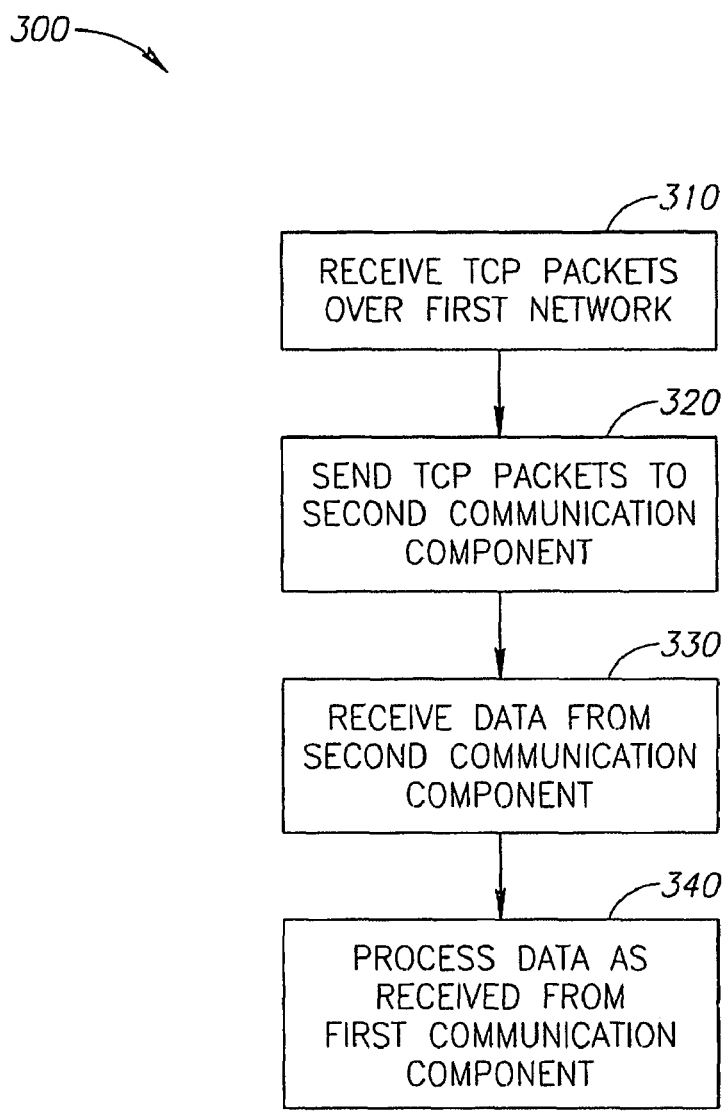
FIG. 3 is an exemplary flowchart according to an embodiment of the invention illustrating a method in accordance with an embodiment of the present invention.

In another embodiment of the present invention, depicted in FIG. 3, flowchart 300 illustrates a method in accordance with embodiments of the present invention that may use one network communication circuit to recombine TCP data segments while another network communication circuit may be receiving TCP data segments. It will be understood that the flowchart of FIG. 3 is a receiving method analogous to the transmission method of FIG. 2, and accordingly, the method is described in brief. A processor may use, for example, a bridge driver to allocate data to a network communication device while another network communication device may be active. If a parallel data path is active, at block 320, the TCP segments may be sent to a second communication device for recombination into data. Data that may have been sent for processing at block 320 may be received at block 330, and routed to a first communication device at block 340, or may be output to computing device or used as appropriate.

Alterations or permutations such as modifications, additions, or omissions may be made to the method without departing from the scope of the invention. The method may include more, fewer, or other steps.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A method comprising:
   receiving data to be transmitted over a second network;
   determining whether to provide said data to a first network communication device or to a second network communication device for conversion into TCP data packets, each of said first and second network communication devices adapted to convert data into TCP data packets, wherein determining whether to provide said data to said first network communication device or to said second network communication device for conversion into TCP data packets comprises determining whether said second network communication device is active, wherein if said second network communication device is active, then said determination is made to provide said data to said first network communication device; and
   upon determining to provide said data to said first network communication device for conversion into TCP data packets, then:
   providing said data to said first network communication device for conversion into TCP data packets, said first network communication device adapted for data transmission over a first network;
   converting said data into TCP data packets by said first network communication device; and
   providing said TCP data packets converted by said first network communication device to said second network communication device for transmission over said second network.

2. The method of claim 1, further comprising transmitting said converted TCP data packets over said second network.

3. The method of claim 1, wherein providing data to said first network communication device for conversion into TCP data packets occurs while said second network communication device is active.

4. The method of claim 1, further comprising placing said first network communication device in a loopback mode.

5. The method of claim 1, wherein said second network is a wireless network.

6. The method of claim 5, wherein said first network is a wired network.

7. The method of claim 1, wherein said data packets are stored in a memory.

8. The method of claim 1, further comprising providing data to said second network communication device for conversion into TCP data packets.

9. An apparatus comprising:
   a first network communication device, the first network communication device comprising a first control circuit for separating data into TCP packets, and a first network communication circuit for communication of TCP packets on a first network;
   a second network communication device, the second network communication device comprising a second control circuit for separating data into TCP packets, and a second network communication circuit for communication of TCP packets on a second network; and
   a processor to receive data to be transmitted over said second network, to determine whether to provide said data to said first network communication device or to said second network communication device for separating said data into TCP packets, wherein said processor is to determine to provide said data to said first network communication device if said second network communication device is active,
   wherein if said determination is to provide said data to said first network communication device for separating said data into TCP packets, then said processor is to route said data to said first network control circuit of said first network communication device for packetizing said data into TCP data packets, to receive said TCP data packets from said first network communication device, and to route said TCP data packets to said second network communication device for transmission over said second network.

10. The apparatus of claim 9, further comprising a memory to store data packets produced by said first network control circuit.

11. The apparatus of claim 9, wherein said first network control circuit is configured to produce TCP data packets while said second network communication device is transmitting data packets over said second network.

12. The apparatus of claim 9, wherein said first network control circuit comprises a Network Interface Card One Gigabyte (NIC1G) Ethernet communication circuit.

13. The apparatus of claim 12, wherein said NIC1G Ethernet communication circuit is configured to operate in loopback mode.

14. The apparatus of claim 12, wherein said second network communication circuit comprises a wireless communication circuit.

* * * * *